United States Patent Office 3,111,359
Patented Nov. 19, 1963

3,111,359
MODIFIED TEXTILE AND INDUSTRIAL FIBERS AND FABRICS AND PROCESS FOR MAKING THEM
Fabian T. Fang, Levittown, Pa., assignor to Rohm & Haas Company, Philadelphia, Pa., a corporation of Delaware
No Drawing. Filed Oct. 16, 1959, Ser. No. 846,777
19 Claims. (Cl. 8—115.5)

The present invention is concerned with the production of artificial fibers and filaments from polymerized monovinyl aromatic compounds such as styrene. The invention is particularly concerned with the production of strong and tough fibers and fabrics of this class as will be pointed out more particularly hereinafter.

Fibers have been produced from polymerized styrene for various uses. However, when such fibers are stretched in order to increase the strength thereof, they are subject to shrinkage and loss of strength on heating. This characteristic limits the usefulness of the fibers since the simple operation of pressing fabrics made therefrom with a hot iron requires extreme caution to avoid excessive heat which would cause serious shrinkage and loss of shape of the textile fabric. In household and industrial uses, this tendency to shrink on heating is a serious limitation of the fibers. The use of the fibers as bristles in brushes is quite common but here there is risk of serious damage if the user should apply the brushes to hot articles during use. The use of fabrics made from such fibers and filaments for filtration of liquids or gases is also limited in scope because of the tendency to shrink on heating. It is desirable to extend the use of such filtering media to embrace the filtration of hot liquids and gases.

In accordance with the present invention, a process is provided for modifying fibers and fabrics formed of polymerized monovinyl aromatic compounds by which the resistance of such articles to heat and to solvents is greatly improved. Surprisingly, the process of the present invention which involves a peculiar type of crosslinking action can be applied to stretched fibers of the polymerized monovinyl aromatic compound without causing severe shrinkage or loss of strength. In fact, the most outstanding characteristic of the present invention is that the stabilization treatment increases the tenacity as well as the toughness of the fibrous articles. By toughness is meant the arithmetic product of the elongation and tenacity.

The fibers of polymerized monovinyl aromatic compounds that are adaptable to treatment in accordance with the present invention are those which contain a substantial amount of a linear polymerization product of a linear aliphatic polyene or of an alkenyl halide. The monovinyl aromatic compound may be copolymerized with the linear aliphatic polyene monomer or with the alkenyl halide or with a mixture thereof; and if the fibers are formed exclusively from such a copolymer, the copolymer should be such that it has an apparent second order transition temperature, herein designated $T_i$, which is at least about 20° C. and may be as high as 100° C. or more. Depending upon the particular polyene or the particular alkenyl halide or both present in the copolymer, the minimum amount of monovinyl aromatic compound required to provide the $T_i$ of at least 20° C. may vary. In general, however, the copolymers contain from 50 to 95% by weight of a monovinyl aromatic compound.

The $T_i$ value referred to is the apparent second order transition temperature or inflection temperature which is found by plotting the modulus of rigidity against temperature. A convenient method for determining modulus of rigidity and transition temperature is described by I.

Williamson, British Plastics 23, 87–90, 102 (September 1950). The $T_i$ value here used is that determined at 300 kg./cm.$^2$.

The fiber may also be formed of a blend of a homopolymer of a monovinyl aromatic compound with a linear homopolymer of a linear aliphatic polyene or of an alkylene halide. A blend with natural or synthetic rubbers may be used. The fiber may comprise (1) a copolymer of one or more monovinyl aromatic compounds or a copolymer of one or more vinyl aromatic compounds with one or more linear aliphatic polyenes or one or more alkenyl halides, and (2) a linear homopolymer or copolymer of a linear aliphatic polyene or alkenyl halide with or without other comonomers which may include one or more monovinyl aromatic compounds of the same or different species or type present in the first-mentioned polymer. In this type of blended polymer fiber, the apparent second order transition temperature, $T_i$, of the blend should be at least about 20° C. and may be as high as 100° C. or higher.

In general, the process of the present invention is applicable to fibers in which the proportion of linear aliphatic polyene compound or of alkenyl halide or of both when both are present in the copolymer or blend is at least 1% by weight of the copolymer or of the blend. The invention is also applicable to fibers formed from polymers in which the proportion of the polyene or alkenyl halide is as high as 50% by weight of the mixture in some instances provided the $T_i$ of the copolymer or blend is above about 20° C. Optimum results are obtained with fibers formed of polymers in which the proportion of the polyene or alkenyl halide is from 5 to 20% by weight of the polymerized mass whether a copolymer or blend makes up the fiber.

The monovinyl aromatic compound which may also be termed a mono-alkenyl aromatic compound may be any of those having the formula $$H_2C = C(R)Z$$

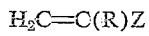

wherein R is hydrogen or an alkyl group advantageously of less than 3 carbon atoms and Z is an aryl group which has positions on an aromatic nucleus available for substitution. The formula includes vinyl aryls, such as styrene, vinyl naphthalene, vinyl diphenyl, vinyl fluorene, etc., and their nuclear-substituted derivatives such as alkyl, aryl, alkaryl, aralkyl, cycloalkyl, alkoxy, aryloxy, chloro, fluoro, chloromethyl, fluoromethyl, and trifluoromethyl nuclear derivatives, for example methyl-styrene, e.g., o-, m-, and p-methyl-styrenes, dimethyl-styrenes, o-, m-, and p-ethyl-styrenes, isopropyl-styrenes, tolyl-styrenes, benzyl-styrenes, cyclohexyl-styrenes, methoxy-styrenes, phenoxy-styrenes, o-, m-, and p-chloro-styrenes, o-, m-, and p-fluorostyrenes, chloro-methyl-styrenes, fluoromethyl-styrenes, trifluoromethyl-styrenes, vinyl-methyl-naphthalenes, vinyl-ethyl-naphthalenes, vinyl-chloro-naphthalenes, vinyl-methyl - chloro - naphthalenes, etc. The polymerizable monomers which can be used advantageously with ionic type catalysts include aromatic compounds having a vinyl group containing an alkyl group in its alpha position, e.g., isopropenyl or alpha-methyl-vinyl, alpha-ethyl-vinyl, alpha-propyl-vinyl, etc. Such alpha-alkyl-vinyl groups may be substituted on benzene, naphthalene, diphenyl, fluorene nuclei, etc., and may have other substituents on the aromatic nuclei as illustrated above for the vinyl aryl compounds.

Examples of linear aliphatic polyenes which may form parts of the copolymer or of homopolymers or copolymers in blends are butadiene-1,3; isoprene or 2-methyl-butadiene-1,3; 2,3-dimethyl-butadiene-1,3; 2-methyl-pentadiene-1,3; hexatriene-1,3,5; myrcene; ocimene; allo-ocimene; etc., and certain substituted aliphatic polyenes such as chloro, fluoro, and aryl derivatives, e.g., chloroprene or 2-chloro-butadiene-1,3; fluoroprene or 2-fluoro-butadiene-1,3; and 1-phenyl-butadiene-1,3.

Examples of alkenyl halides which may be present in the copolymer or homopolymers or copolymers in blends making up the fibers are methallyl chloride, allyl, chloride, 2,3-dichloropropene-1, crotyl chloride, vinyl chloride, vinylidene chloride, 1-chloro-1-fluoro-ethylene, and 4-chloro-butene-1, pentenyl-chlorides.

The present invention is not concerned with the steps employed in preparing the fibers since fibers have been formed from such polymeric materials heretofore and, in their making, they have been stretched to orient the polymer molecules longitudinally of the axis of the fiber. Such stretching may be from 10% to several thousand percent of the original length of the fiber as obtained by known spinning processes. It is with the stretched, oriented fibers that the process of the present invention is concerned.

In accordance with the present invention, it has been found that the copolymers and polymer blends in the fibers so far described can be cross-linked by means of an alkylation catalyst. The reaction essentially involves the alkylation of the aromatic nuclei either (1) with the unsaturated portion of the linear polymer when a polyene is involved, or (2) with the polymerized alkenyl halide by the elimination of hydrogen halide from the polymerized alkenyl halide units when such units are involved, or (3) with both (1) and (2). This alkylation cross-linking action may be effected by the use of Lewis acids or Friedel-Crafts catalysts such as aluminum chloride, ferric chloride, stannic chloride, titanium chloride, the corresponding bromides such as aluminum bromide and so forth, and boron trifluoride, especially its complexes such as with ethyl ether. Instead of the catalysts just mentioned, the alkylation can be effected simply by treatment with strong acids such as sulfuric acid, phosphoric acid, chlorosulfonic acid, alkyl or aromatic sulfonic acids such as o- or p-toluenesulfonic acid, or methanesulfonic acid, and polyphosphoric acid.

The treatment with the Lewis acid catalysts may be effected in solvents such as nitromethane when such catalysts are of solid character; but when the liquid form such as the boron trifluoride ethyl ether complex is employed, no solvent need be used though if desired, suitable solvent may be employed. In this procedure of operation, when a solvent is employed, the tendency of the fibers to shrink in the solvent can be substantially completely prevented by employing the Lewis acid catalyst at a very high concentration therein or, if desired, by holding the fibers under tension during treatment. The necessity to hold the fibers under tension is practically eliminated when concentrations of the catalyst in the neighborhood of 1 mole per liter or higher are used.

The intensity and duration of treatment is preselected to render the fibers or fabrics resistant to shrinkage at any predetermined temperature from about 90° C. (a common scouring temperature) to 200° C. or even higher. Such treatment also renders the fibers and fabrics resistant to dry-cleaning solvents.

The temperature of treatment may range from about 0° C. to about 100° C. when the Lewis acid catalyst is employed. In general, the time of treatment varies inversely with the temperature and it may range from about one minute up to two hours at the higher temperature of the range above and for about 1 to 72 hours at the lower temperature depending on the extent of cross-linking desired. The treatment can be allowed to proceed for longer times than specified but ordinarily such additional treatment provides no additional benefit.

In the case of employing strong acids, such as the commercial 96% by weight, sulfuric acid, temperatures may range from about 0° to 35° C. In the case of sulfuric acid, the concentration may vary from 70 to 103%. The time of treatment may vary from about 1 minute up to 3 days at about 20° C. depending upon (1) the denier of the fiber, the finer the fiber the shorter the time needed to provide effective cross-linking and stabilization, and (2) the extent of stabilization desired. At 0° C. a minimum period of about 10 to 15 minutes is generally needed to effect adequate cross-linking to provide resistance to shrinkage at 90° C. Temperatures higher than 35° C. should be avoided since above that temperature sulfonation is favored which leads to swelling and dissolution of the fiber before cross-linking is adequately performed. With proper control of the temperature to prevent too rapid sulfonation, the treatment may be allowed to proceed for 3 or 4 days without causing shrinkage or dissolution of the fiber during the treatment. Such extended treatment results in sulfonation which may be of advantage for certain purposes, particularly if the fabrics to be made from the fibers are to be employed for ion-exchange purposes. Ordinarily, for the purposes of the present invention, relatively little sulfonation is desired and the treatment with sulfuric acid in the temperature range specified for the short time ranges specified results in the cross-linking of the fibers by alkylation but with the introduction of 0.03 sulfonic acid groups per aromatic nucleus or less. This amount of sulfonic acid in the fiber is in no way disadvantageous when the product is to be employed for textile uses and in many industrial uses. In fact, in textile usage this small amount of sulfonic acid groups imparts a desirable moisture regain characteristic rendering the products more comfortable to the feel and reducing the tendency of the product to develop static electricity, especially in automobile seat covers. This small amount of sulfonic acid groups also modifies the dyeability of the fibrous products made from the fibers.

The alkylation may be effected by the employment of any of the other strong acids mentioned at relatively high concentrations in aqueous media. Concentrations of 70 to 98% may be used. In general, the same range of temperature may be employed as in the case of sulfuric acid. Similiar time periods are generally applicable as well.

Termination of the alkylation treatment may be effected by immersion or rinsing in water. If desired, the first rinsing may be effected with a less concentrated solution of the acid employed during the alkylation and such rinsing may be carried out in successive stages of increasing dilution followed finally with one or more rinses in water.

The stabilization treatment may be applied to loose fibers, to filamentary bundles such as tows, yarns, plied structures such as threads, felt-like masses which may be termed non-woven fabrics, as well as fabrics of woven, knitted, netted, knotted, braided, or otherwise formed textile or industrial fabrics. The treating liquid may be applied by spraying thereof upon the fabric, or by suitably immersing the fabric or filamentary structure in the liquid. Slashers or textile pads may be employed.

The stabilized fibers or fabrics are far more vesatile in utility than the uncross-linked polystyrene or related fibers. They are adapted to be used in textiles, such as for automobile seat covers, dresses, curtains, draperies, and are adapted to be subjected to heat as during ironing and laundering without undergoing shrinkage. The products not only resist shrinkage under heat, but they are in general stronger and tougher than the fibers from which they are made. The fibers can be employed in the making of all sorts of industrial fabrics, felted, woven, or otherwise formed, and are particularly adapted to heavy duty filtration of all sorts of gases and liquors even at elevated temperatures. The fabrics are also adapted to be converted as by sulfonation into ion-exchange fabrics adapted to be employed for a wide variety of uses, the pile or tufted type of fabric being particularly useful in this connection.

In the examples which are illustrative of the present invention, the parts and percentages are by weight unless otherwise indicated.

The following Example A is a typical procedure by which stretched fibers of the polymer blend adapted to be converted into the stabilized products of the present invention can be made.

Example A

Two emulsion polymers are prepared in aqueous dispersions using 3% potassium laurate based on solids in each case, the first being polystyrene and the second polybutadiene both at 40% polymer solids by weight. The two dispersions are blended in an 85:15 styrene-to-butadiene-weight ratio and 5% toluene based on polystyrene solids is gradually added with stirring. The dispersion blend is forced through a platinum-alloy spinneret into a coagulating bath. The spinneret has a face diameter of 0.5 inch and contains 100 holes each of 0.0025 inch diameter. The coagulating bath is an aqueous 30% hydrochloric acid solution also containing 0.5% p-diisobutyl-phenoxyethoxyethyl dimethyl benzyl ammonium chloride and is maintained at 85° C. The bundle of filaments formed is drawn through the bath at a rate of about eleven meters per minute. The immersion path is four inches. The yarn is washed on a roll immersed in a trough fed by fresh water and equipped with an overflow pipe. The yarn is then dried by passing it over two canted heated drums revolving at a speed providing a linear peripheral rate of about 11 meters per minute. The temperature of the drums is 230° C. The yarn is then passed over rolls operating at differential speeds to stretch the yarn about 500%. The first of these two rolls is heated to about 120° C. The stretched yarn is collected on a bobbin winder. It has a denier of about 200, a tenacity of 0.9 gram per denier, and an extensibility of 25% at break.

Example 1

A skein of a yarn formed of continuous filaments (200 denier, 100 filament) of a blend of 85 parts of polystyrene and 15 parts of polybutadiene which had been stretched about 500% during manufacture (such as obtained by Example A) is immersed in 95% sulfuric acid at 25° C. for one day. The treated skein is then rinsed in water and dried by exposure to the ambient atmosphere. The resulting yarn is insoluble in organic solvents so that it is dry-cleanable. It also is entirely resistant to shrinkage at temperatures up to and including 200° C. so that it can be scoured without risk of shrinkage. As a result of the treatment, the tenacity is increased by about 50% and the toughness is increased by about 500%.

Example 2

A fabric woven of 1000-denier yarns (500 filament) having their filaments formed of a blend of 80 parts of polystyrene and 20 parts of polybutadiene which yarns had been stretched about 400% during manufacture is treated in the same way as in Example 1 with similar results. The fabric is resistant to scouring and dry-cleaning.

Example 3

A skein of a yarn formed of continuous filaments (400 denier, 120 filament) of a copolymer of 90 parts of styrene and 10 parts of isoprene is wound on a perforated bobbin of glass and then immersed in a 0.5 molar solution of aluminum chloride in nitromethane at 30° C. for two hours. The treated package is then rinsed with water and air-dried. The resulting yarn is insoluble in organic solvents so that it is dry-cleanable. It also is entirely resistant to shrinkage at temperatures up to and including 200° C. so that it can be scoured without risk of shrinkage. As a result of the treatment, the tenacity is increased by about 50% and the toughness is increased by about 500%.

Example 4

Example 3 is repeated with skein of a 400 denier/120 filament yarn of a polymer blend comprising 85 parts of polystyrene and 15 parts of poly(vinyl chloride) which had been stretched 1000% during manufacture. Similar stabilization of the yarn is obtained.

Example 5

The procedure of Example 2 is repeated with a non-woven fabric formed of four thicknesses or layers of a carded web in which the machine direction of alternate layers is at right angles to that of the adjacent layers. The carded web is formed of 2-inch fibers (3 denier per filament) formed of a copolymer of 50 parts of vinyltoluene and 50 parts of vinylidene chloride. The fabric is resistant to dry-cleaning, organic solvents generally, and is resistant to shrinkage during conventional scouring operations from 90° C. to 100° C.

Example 6

A fabric woven of continuous filament yarns formed of a blend of 75 parts of polystyrene and 25 parts of natural rubber, the filaments of which had been stretched 600% during manufacture, is immersed in boron trifluoride ethyl etherate at 30° C. for 10 hours. The treated fabric is rinsed with methanol and then with water, and air-dried. The filaments in the fabric are cross-linked so that the latter is insoluble in organic solvents and is stabilized against shrinkage on laundering and dry-cleaning.

Example 7

(a) A skein of the same constitution as in Example 1 is immersed in 85% phosphoric acid at 50° C. for two days. The resulting yarn is then rinsed in water and air-dried. The dried yarn is insoluble in organic solvents and is knitted to form a tubular fabric. The resulting fabric is resistant to shrinkage during normal scouring operations at temperatures of 90° to 100° C.

(b) A similarly treated yarn of the same constitution is used to form the pile of a pile fabric, the backing of which consists of a woven glass fabric.

It is to be noted that changes and variations may be made without departing from the spirit and scope of the invention as defined in the appended claims.

I claim:

1. A process which comprises treating a fibrous product comprising a fiber formed of linear polymer molecules at least partially oriented longitudinally of the axis of the fiber, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transition temperature of at least 20° C., with an alklation catalyst under conditions including temperature at which aromatic nuclei of the polymeric mass are alkylated by polymerized units of polyene and alkenyl halide compounds, the treatment being carried out for a sufficient time to render the fibrous product resistant to solvents.

2. A process which comprises treating a fibrous product comprising a fiber formed of linear polymer molecules at least partially oriented longitudinally of the axis of the fiber, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transistion temperature of at least 20° C., with an alkylation catalyst under conditions including temperature at which aromatic nuclei of the polymeric mass are alkylated by polymerized units of polyene and alkenyl halide compounds, the treatment being carried out for a sufficient time to substantially eliminate the shrinkage of the fibrous product on heating to a temperature of 90° C.

3. A process as defined in claim 1 in which the fibrous product comprises a multifilament yarn formed of the fibers defined in claim 1.

4. A process as defined in claim 1 in which the fibrous product is a woven fabric comprising fibers as defined in claim 1.

5. A process as defined in claim 1 in which the catalyst is a Lewis acid.

6. A process as defined in claim 1 in which the catalyst is a concentrated solution of a strong acid.

7. A process as defined in claim 1 in which the catalyst is a concentrated solution of phosphoric acid.

8. A process as defined in claim 1 in which the catalyst is concentrated sulfuric acid and the temperature is from 0° to 35° C.

9. A process which comprises treating a fibrous product comprising a fiber formed of a linear copolymer, showing orientation longitudinally of the axis of the fiber and having an apparent second order transition temperature of at least 20° C., of (A) at least one monovinyl aromatic compound with (B) at least one copolymerizable compound selected from the group consisting of linear aliphatic polyene monomers and alkenyl halides, with an alkylation catalyst under conditions including temperature under which aromatic nuclei of the copolymer are alkylated by polymerized units of the aforementioned compound (B), the treatment being carried out for a sufficient time to substantially eliminate the shrinkage of the fibrous product on heating to temperatures of 90° C.

10. A process which comprises treating a fibrous product comprising a fiber formed of a blend, having an apparent second order transistion temperature of at least 20° C., of (1) a linear polymer of (A) at least one monovinyl aromatic compound and (2) a linear polymer of (B) at least one compound selected from the group consisting of linear aliphatic polyene monomers and alkenyl halides, said linear polymers being at least partially oriented longitudinally of the axis of the fiber, with an alklation catalyst under conditions including temperature under which aromatic nuclei of the copolymer are alkylated by polymerized units of the aforementioned compound (B), the treatment being carried out for a sufficient time to substantially eliminate the shrinkage of the fibrous product on heating to temperatures of 90° C.

11. A process which comprises treating a fibrous product comprising a fiber formed of a linear copolymer of styrene and butadiene having an apparent second order transistion temperature of at least 20° C., said linear coplymer being at least partially oriented longitudinally of the axis of the fiber, with concentrated sulfuric acid at a temperature between about 0° C. and 25° C. until the shrinkage of the fibrous product on heating is substantially reduced by cross-linking.

12. As an article of manufacture, a fibrous product comprising a fiber formed of linear polymer molecules, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transistion temperature of at least 20° C., the linear polymers showing orientation longitudinally of the axis of the fiber and being cross-linked in the fiber to a condition of solvent resistance by alkylation of aromatic nuclei by members selected from the group consisting of polymerized units of polyene and alkenyl halide compounds.

13. An article as defined in claim 12 in which the product is a yarn comprising a plurality of the cross-linked fibers.

14. An article as defined in claim 12 in which the product is a woven textile fabric comprising the cross-linked fibers as defined in claim 12.

15. An article as defined in claim 12 in which the product is a pile fabric comprising the cross-linked fibers as defined in claim 12.

16. As an article of manufacture, a fibrous product comprising a fiber formed of linear polymer molecules, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transition temperature of at least 20° C., the linear polymers showing orientation longitudinally of the axis of the fiber and being cross-linked in the fiber by alkylation of aromatic nuclei by members selected from the group consisting of polymerized units of polyene and alkenyl halide compounds, the polymeric mass of the fiber containing up to about 0.03 sulfonic acid group per aromatic nucleus and the extent of cross-linking being sufficient to eliminate the shrinkage of the fibrous product on heating to a temperature of 90° C.

17. An article as defined in claim 16 in which the product is a woven automobile seat cover fabric.

18. As an article of manufacture, a fibrous product comprising a fiber comprising linear polymer molecules, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transition temperature of at least 20° C., the linear polymers showing orientation longitudinally of the axis of the fiber and being cross-linked in the fiber to a condition of solvent resistance by alkylation of aromatic nuclei by members selected from the group consisting of polymerized units of polyene and alkenyl halide compounds.

19. A process which comprises treating a fibrous product comprising a fiber comprising linear polymer molecules at least partially oriented longitudinally of the axis of the fiber, at least part thereof being formed of at least one monovinyl aromatic compound and at least part thereof being formed of at least one compound selected from the group consisting of linear aliphatic polyene monomers and alkenyl halides, the polymeric mass of which the fiber is formed having an apparent second order transition temperature of at least 20° C., with an alkylation catalyst under conditions including temperature at which aromatic nuclei of the polymeric mass are alkylated by polymerized units of polyene and alkenyl halide compounds, the treatment being carried out for a sufficient time to render the fibrous product resistant to solvents.

References Cited in the file of this patent

UNITED STATES PATENTS

| | | |
|---|---|---|
| 2,338,978 | Shepherd | Jan. 11, 1944 |
| 2,420,565 | Rugeley et al. | May 13, 1947 |
| 2,548,853 | Baker | Apr. 17, 1951 |
| 2,560,492 | Sparks et al. | July 10, 1951 |
| 2,605,509 | Dreisbach | Aug. 5, 1952 |
| 2,635,323 | Ginzel | Apr. 21, 1953 |
| 2,661,339 | Sparks et al. | Dec. 11, 1953 |
| 2,685,120 | Brant | Aug. 3, 1954 |
| 2,715,115 | Blanchette et al. | Aug. 9, 1955 |
| 2,828,528 | Gajjar | Apr. 1, 1958 |
| 2,889,611 | Bedell | June 9, 1959 |
| 2,933,460 | Richter et al. | Apr. 19, 1960 |
| 2,961,290 | Kolb | Nov. 22, 1960 |
| 3,014,776 | Mecco | Dec. 26, 1961 |
| 3,049,526 | D'Alelio | Aug. 14, 1962 |
| 3,054,784 | Volans | Sept. 18, 1962 |
| 3,068,180 | Van Amerongen | Dec. 11, 1962 |